US012429286B2

(12) United States Patent
Luetkenhaus

(10) Patent No.: US 12,429,286 B2
(45) Date of Patent: Sep. 30, 2025

(54) COOKING APPLIANCE WITH A CAMERA AND METHOD FOR THE OPERATION THEREOF

(71) Applicant: Miele & Cie. KG, Guetersloh (DE)

(72) Inventor: Kay Luetkenhaus, Beckum (DE)

(73) Assignee: MIELE & CIE. KG, Guetersloh (DE)

( * ) Notice: Subject to any disclaimer, the term of this patent is extended or adjusted under 35 U.S.C. 154(b) by 189 days.

(21) Appl. No.: 18/260,249

(22) PCT Filed: Dec. 16, 2021

(86) PCT No.: PCT/EP2021/086078

§ 371 (c)(1),
(2) Date: Jul. 3, 2023

(87) PCT Pub. No.: WO2022/148624

PCT Pub. Date: Jul. 14, 2022

(65) Prior Publication Data

US 2024/0053101 A1 Feb. 15, 2024

(30) Foreign Application Priority Data

Jan. 5, 2021 (DE) ..................... 10 2021 100 048.3

(51) Int. Cl.
*F27D 21/02* (2006.01)
*F24C 7/08* (2006.01)

(52) U.S. Cl.
CPC .............. *F27D 21/02* (2013.01); *F24C 7/085* (2013.01); *F27D 2021/026* (2013.01)

(58) Field of Classification Search
CPC ..... F24C 7/085; F27D 2021/026; F27D 21/02
See application file for complete search history.

(56) References Cited

U.S. PATENT DOCUMENTS

| | | | | |
|---|---|---|---|---|
| 10,760,794 | B2 * | 9/2020 | Cheng | H05B 6/6452 |
| 2018/0184668 | A1 | 7/2018 | Stork Genannt Wersborg | |
| 2019/0335074 | A1 * | 10/2019 | Malkes | H04N 23/74 |
| 2021/0003289 | A1 * | 1/2021 | Iwamoto | F24C 7/087 |
| 2021/0095864 | A1 * | 4/2021 | Nakashima | F24C 15/006 |
| 2021/0222887 | A1 * | 7/2021 | Moore | F27D 21/02 |

FOREIGN PATENT DOCUMENTS

DE 202012006926 U1 7/2013

* cited by examiner

*Primary Examiner* — Shahan Ur Rahaman
(74) *Attorney, Agent, or Firm* — LEYDIG, VOIT & MAYER, LTD.

(57) ABSTRACT

A cooking appliance includes: a housing having a cooking chamber disposed in the housing and bounded by at least one cooking chamber wall of the housing; and a camera disposed in the housing for observing the cooking chamber and/or an item to be cooked placed in the cooking chamber, the camera being in image transmission connection with the cooking chamber via a housing opening in the at least one cooking chamber wall, the housing opening being sealed with respect to the cooking chamber by a transparent cover. The transparent cover is in heat transfer connection with a cover heater such that the transparent cover remains free from condensation in any operating state of the cooking appliance.

15 Claims, 3 Drawing Sheets

COOKING APPLIANCE WITH A CAMERA AND METHOD FOR THE OPERATION THEREOF

CROSS-REFERENCE TO PRIOR APPLICATIONS

This application is a U.S. National Phase application under 35 U.S.C. § 371 of International Application No. PCT/EP2021/086078, filed on Dec. 16, 2021, and claims benefit to German Patent Application No. DE 10 2021 100 048.3, filed on Jan. 5, 2021. The International Application was published in German on Jul. 14, 2022 as WO/2022/148624 A1 under PCT Article 21(2).

FIELD

The invention relates to a cooking appliance and a method for operation thereof.

BACKGROUND

Such cooking appliances and methods for operation thereof have been previously described in various embodiments in the art and include a housing having a cooking chamber disposed in the housing and bounded by at least one cooking chamber wall of the housing and further include a camera disposed in the housing for observing the cooking chamber and/or an item to be cooked placed in the cooking chamber, the camera being in image transmission connection with the cooking chamber via a housing opening in the cooking chamber wall, and the housing opening being sealed with respect to the cooking chamber by means of a transparent cover.

SUMMARY

In an embodiment, the present invention provides a cooking appliance, comprising: a housing having a cooking chamber disposed in the housing and bounded by at least one cooking chamber wall of the housing; and a camera disposed in the housing, the camera being configured to observe the cooking chamber and/or an item to be cooked placed in the cooking chamber, the camera being in image transmission connection with the cooking chamber via a housing opening in the at least one cooking chamber wall, the housing opening being sealed with respect to the cooking chamber by a transparent cover, wherein the transparent cover is in heat transfer connection with a cover heater such that the transparent cover remains free from condensation in any operating state of the cooking appliance.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
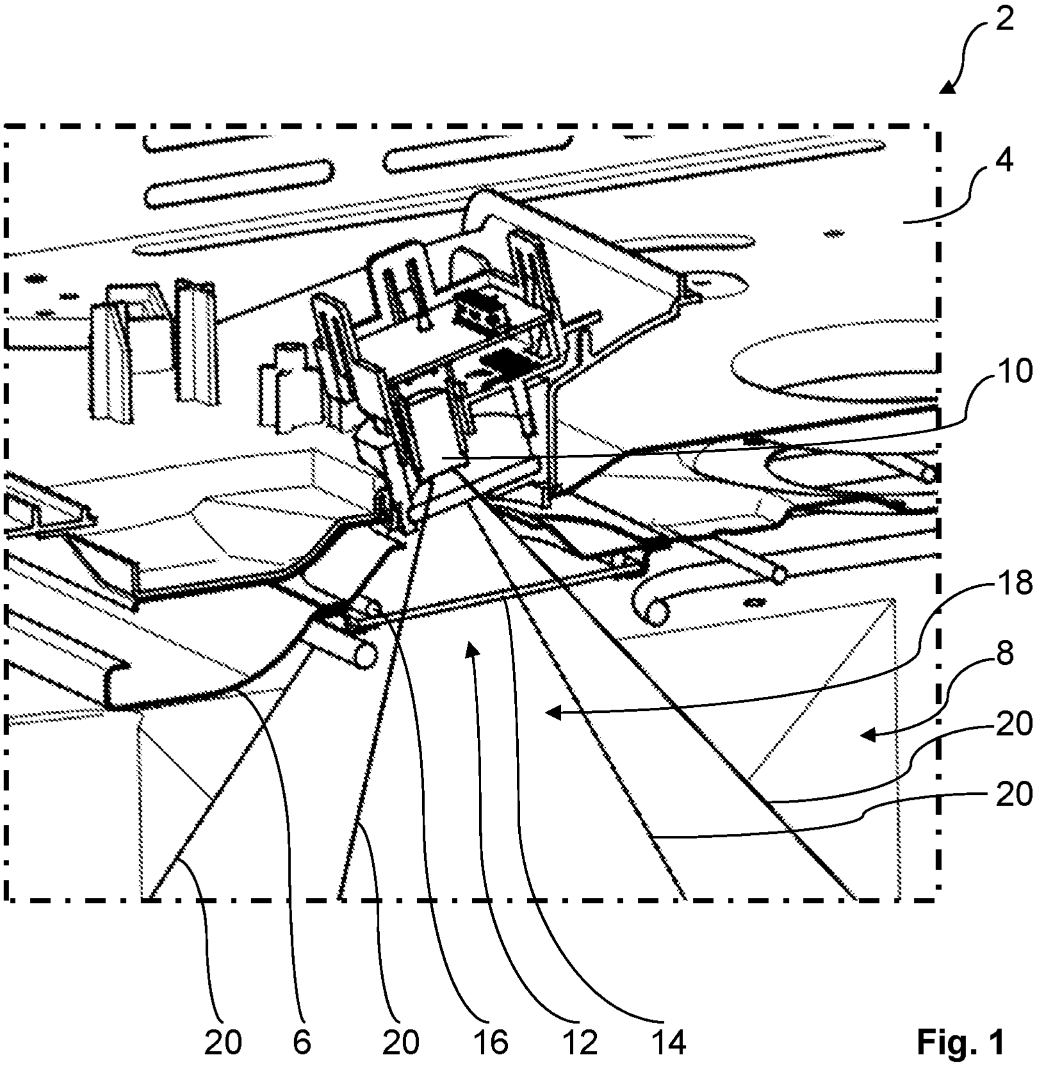
FIG. 1 is a partial perspective view of an exemplary embodiment of the inventive cooking appliance for performing the method of the invention.

In an embodiment, the present invention improves a cooking appliance with a camera and a method for operation thereof.

In an embodiment, the present invention provides a cooking appliance as described herein and which is characterized in that the cover is in heat transfer connection with a cover heater in such a manner that the cover remains free from condensation in any operating state of the cooking appliance. In an embodiment, the present invention provides a method for operating such a cooking appliance. The cover heater may be in the form of, for example, a radiant heating element, such as a tubular heating element. The expression "cooking chamber wall" is also intended to have a wide meaning and to include also a cooking chamber wall in the form of a top wall or a bottom wall as well as a cooking chamber wall in the form of a so-called "inserted rear wall."

An advantage provided by the invention is, in particular, that a cooking appliance with a camera and a method for operation thereof are improved. The inventive design of the cooking appliance with a camera and of the method for operation thereof enables high-quality monitoring of the cooking chamber and/or of the item to be cooked, even under difficult ambient conditions, namely under difficult conditions in the cooking chamber. Such difficult cooking chamber conditions are present especially when an item to be cooked releases moisture into the cooking chamber while a cooking process is carried out in the cooking chamber. However, special cooking programs, such as steam cooking programs or steam-assisted cooking programs, which introduce a large amount of moisture into the cooking chamber during the cooking process, are also used in modern cooking appliances. The moisture then condenses on the components of the cooking appliance that are cooler relative to the remainder of the cooking chamber, for example, on the at least one cooking chamber wall bounding the cooking chamber. This results in condensation. In accordance with the invention, such condensation is now prevented on the cover, so that the appliance functions that are associated with the capture of images of the cooking chamber and/or of the item to be cooked by means of the camera are not impaired or even made impossible, even under the aforementioned difficult cooking chamber conditions.

The cooking appliance according to the invention can, in principle, be freely selected within wide suitable limits in terms of type, function, material, and dimensions. For example, the inventive cooking appliance may be a household appliance or an industrial appliance; i.e., a cooking appliance for professional use. Furthermore, the cooking appliance may be in the form of a baking oven, a steam cooker, a microwave appliance, or a combination appliance having a plurality of different types of heating. In addition, the inventive cooking appliance may also include special cleaning functions, such as, for example, cleaning programs. These cleaning programs may provide for the use of cleaning liquids or a pyrolysis mode of operation of the cooking appliance.

An advantageous embodiment of the inventive cooking appliance provides that the cover heater be disposed on a side of the cover facing the camera. In this way, the cover heater is itself protected from unwanted environmental influences, for example, from exposure to cooking vapors or the like present in the cooking chamber.

Another advantageous embodiment of the inventive cooking appliance provides that the cover heater be configured as an integral part of the cover. This reduces the number of components of the inventive cooking appliance and thereby the expense of storage, transport, and assembly. The cover heater may, for example, be in the form of a metallic coating of the cover or in the form of heating wires embedded in the cover.

Another advantageous embodiment of the inventive cooking appliance provides that the cover heater be disposed outside an imaging field of the camera. Thus, the imaging field; i.e., the region that is relevant for image capturing by the camera, is not covered up by the cover heater in an undesired manner. For example, it may be provided that the cover heater be disposed only in a peripheral region of the cover. However, it is also conceivable that the cover heater may be arranged in a distributed manner over the cover such that the cover heater heats the cover over a large area and, in addition, keeps the imaging field substantially clear.

An advantageous embodiment of the inventive cooking appliance provides that the cover heater be configured and controllable by a controller of the cooking appliance in such a manner that in a cooking mode of the cooking appliance, the cover can, by means of the cover heater, reach a temperature above a temperature of the cooking chamber wall surrounding the cover, preferably, that in a cooking mode of the cooking appliance, the cover can, by means of the cover heater, reach a temperature of at least 100° C. This allows the function of the cover heater, namely, the prevention of condensation on the cover, to be easily implemented in terms of construction, manufacture, and circuitry. This applies especially to the preferred variant of this embodiment.

Correspondingly, an advantageous embodiment of the inventive method provides that the cover heater be controlled by the controller of the cooking appliance in such a manner that in a cooking mode of the cooking appliance, the cover heater causes the cover to reach a temperature above a temperature of the cooking chamber wall surrounding the cover, preferably, that in a cooking mode of the cooking appliance, the cover heater causes the cover to reach a temperature of at least 100° C.

A further advantageous embodiment of the inventive cooking appliance provides that the cover heater be configured and controllable by a controller of the cooking appliance in such a manner that in a pyrolysis mode of the cooking appliance, the cover can, by means of the cover heater, reach a temperature of at least 400° C. Thus, in addition to preventing condensation on the cover while a cooking process is carried out in the cooking chamber, it is possible to clean the cover of grease residues and the like by burning them using the cover heater.

Correspondingly, a further advantageous embodiment of the inventive method provides that the cover heater be controlled by the controller of the cooking appliance in such a manner that in a pyrolysis mode of the cooking appliance, the cover heater causes the cover to reach a temperature of at least 400° C.

An advantageous variant of the two last-mentioned embodiments of the inventive cooking appliance provides that the cover heater have a heating capacity of at least 20 W, preferably of at least 50 W. Thus, the cover heater has a heating capacity sufficient to reliably protect the cover from condensation in any operating state of the cooking appliance. This applies especially to the preferred variant of this embodiment, which, in addition, also ensures that any residues of grease or the like which may be present on the cover are reliably burned during a pyrolysis mode of an inventive cooking appliance in the form of a pyrolytic cooking appliance.

Another advantageous embodiment of the inventive method provides that in a steam-assisted cooking mode of the cooking appliance, the controller control the cover heater in such a manner that the cover heater is turned on substantially simultaneously with the beginning of this cooking mode. This securely prevents condensation on the cover during a steam-assisted cooking mode throughout the duration of the steam-assisted cooking mode. The expression "steam-assisted cooking mode" is intended to have a wide meaning and to include also a pure steam mode of the cooking appliance.

Moreover, a further advantageous embodiment of the inventive method provides that in a pyrolysis mode of the cooking appliance, the controller control the cover heater in such a manner that, substantially after the cooking chamber is heated to a predefined pyrolysis temperature, the cover heater is turned on at the beginning of a holding phase of this pyrolysis temperature. This effectively reduces the power consumption of the cooking appliance during the pyrolysis mode. However, it is also conceivable for the cover heater to be turned on already when the cooking chamber begins to be heated to a predefined pyrolysis temperature.

Figure 2:
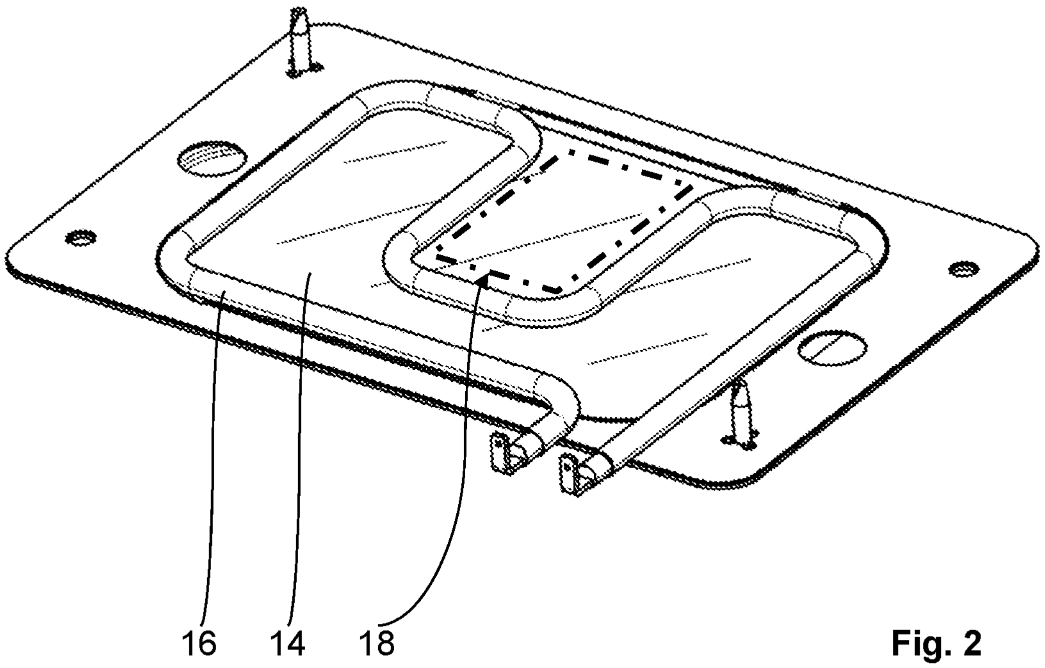
FIG. 2 is a perspective view of a first variant of the cover heater of the exemplary embodiment.
Figure 3:
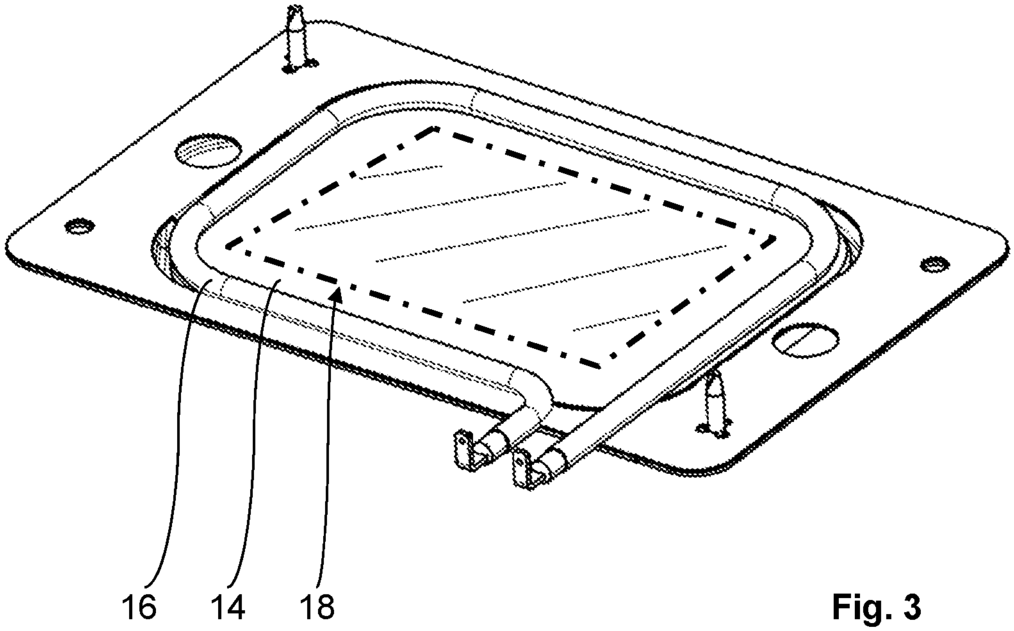
FIG. 3 is a perspective view of a second variant of the cover heater of the exemplary embodiment.

In FIGS. 1 through 3, an exemplary embodiment of the inventive cooking appliance is illustrated in purely schematic form.

Cooking appliance 2 is in the form of an oven capable of operating in a steam-assisted cooking mode and includes a housing 4 having a cooking chamber 8 disposed in housing 4 and bounded by at least one cooking chamber wall 6 of housing 4 and further includes a camera 10 disposed in housing 4 for observing cooking chamber 8 and/or an item to be cooked placed in cooking chamber 8, the camera 10 being in image transmission connection with cooking chamber 8 via a housing opening 12 in cooking chamber wall 6, and the housing opening 12 being sealed with respect to cooking chamber 8 by means of a transparent cover 14 such as, for example, a glass pane. In the present exemplary embodiment, cover 14 has a metal frame for mounting cover 14 to cooking chamber wall 6 of housing 4, the metal frame having a transparent glass pane attached thereto. The attachment of the aforementioned glass pane to the metal frame and the mounting of cover 14 to cooking chamber wall 6 are accomplished here in a manner known to those skilled in the art.

In accordance with the invention, cover 14 is in heat transfer connection with a cover heater 16 in the form of a tubular heating element in such a manner that cover 14 remains free from condensation in any operating state of cooking appliance 2. Cover heater 16 is shown in particular in FIGS. 2 and 3 and is disposed on a side of cover 14 facing the camera 10.

In FIGS. 2 and 3, two different variants of the cover heater 16 for the cooking appliance 2 according to the present exemplary embodiment are illustrated in purely schematic form. Accordingly, the individual components are given the same reference numerals in FIGS. 1 through 3.

Viewing FIGS. 1 through 4 together, it can be seen that cover heater 16 is disposed outside an imaging field 18 of camera 10. Imaging field 18 is symbolized in FIG. 1 by solid lines 20 and in FIGS. 2 and 3 by dot-dash lines 20, the lines 20 spatially bounding the imaging field 18.

In the present exemplary embodiment, cover heater 16 is configured and controllable by a controller of cooking appliance 2 in such a manner that in a cooking mode of cooking appliance 2, cover 14 can, by means of cover heater 16, reach a temperature above a temperature of the cooking chamber wall 6 surrounding cover 14. In this connection, in a cooking mode of cooking appliance 2, cover 14 can, by means of cover heater 16, reach a temperature of at least 100° C. Furthermore, cover heater 16 is configured and controllable by the controller of cooking appliance 2 in such a manner that in a pyrolysis mode of the cooking appliance 2 in the form of a pyrolytic appliance, cover 14 can, by means of cover heater 16, reach a temperature of at least 400° C. For this purpose, cover heater 16 has a heating capacity of at least 20 W, namely of at least 50 W.

In the following, the operation of the inventive cooking appliance and the inventive method according to the present exemplary embodiment will be described in more detail with reference to FIGS. 1 through 3.

Cooking device 2 is in a steam-assisted cooking mode, the item to be cooked, which is located in cooking chamber 8, being prepared in a manner known to those skilled in the art. For steam assistance, steam is introduced into the cooking mode in a generally known manner. However, it is also possible to conceive of other useful measures for supplying steam and/or water in liquid form to cooking chamber 8 during the steam-assisted cooking mode. In the cooking mode; i.e., during the cooking process, cover heater 16 is controlled by the controller of cooking appliance 2 in such a manner that cover 14 remains free from condensation in the aforementioned cooking mode of cooking appliance 2.

To this end, cover heater 16 is controlled by the controller of cooking appliance 2 in such a manner that in the aforementioned cooking mode of cooking appliance 2, cover heater 16 causes cover 14 to reach a temperature above a temperature of the cooking chamber wall 6 surrounding cover 14, namely, that in the aforementioned cooking mode of cooking appliance 2, cover heater 16 causes cover 14 to reach a temperature of at least 100° C. In the steam-assisted cooking mode of cooking appliance 2, the controller controls cover heater 16 in such a manner that cover heater 16 is turned on substantially simultaneously with the beginning of this cooking mode. This securely prevents condensation on cover 14 during a steam-assisted cooking mode throughout the duration of the steam-assisted cooking mode.

Upon completion of the aforementioned cooking mode, cooking chamber 8 of cooking appliance 2 is to be cleaned of grease residues and the like using a pyrolysis program; i.e., a pyrolysis mode of cooking appliance 2, in a manner known to those skilled in the art.

To this end, in the present exemplary embodiment, cover heater 16 is controlled by the controller of cooking appliance 2 in such a manner that in the aforementioned pyrolysis mode of cooking appliance 2, cover heater 16 causes cover 14 to reach a temperature of at least 400° C. Upon selection of the pyrolysis program and starting of the pyrolysis mode, cover heater 16 is controlled by the controller of cooking appliance 2 in such a manner that, substantially after cooking chamber 2 is heated to a predefined pyrolysis temperature, cover heater 16 is turned on at the beginning of a holding phase of this pyrolysis temperature. This effectively reduces the power consumption of cooking appliance 2 during the pyrolysis mode. However, it is also conceivable for the cover heater to be turned on already when the cooking chamber begins to be heated to a predefined pyrolysis temperature.

The present invention is not limited to the present exemplary embodiment. For example, the invention may also be advantageously used with other cooking appliances. In this regard, see the explanations in the introductory part of the specification. Furthermore, the invention is not limited to the details regarding the construction, manufacture, circuitry, and method of the present embodiment with the two variants. For example, in other embodiments of the invention, it may be provided that the cover heater be configured as an integral part of the cover.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A cooking appliance, comprising:

a housing having a cooking chamber disposed in the housing and bounded by at least one cooking chamber wall of the housing; and a camera disposed in the housing, the camera being configured to observe the cooking chamber and/or an item to be cooked placed in the cooking camber, the camera being in image transmission connection with the cooking chamber via a housing opening in the at least one cooking chamber wall, the housing opening being sealed with respect to the cooking chamber by a transparent cover, wherein the transparent cover is in heat transfer connection with a cover heater such that the transparent cover remains free from condensation in any operating state of the cooking appliance, and wherein the cover heater is configured and controllable by a controller of the cooking appliance such that, in a pyrolysis mode of the cooking appliance, the transparent cover is configured, by the cover heater, to reach a temperature of at least 400° C.

2. The cooking appliance of claim 1, wherein the cover heater is disposed on a side of the transparent cover facing the camera.

3. The cooking appliance of claim 1, wherein the cover heater is an integral part of the transparent cover.

4. The cooking appliance of claim 1, wherein the cover heater is disposed outside an imaging field of the camera.

5. The cooking appliance of claim 1, wherein the cover heater is configured and controllable by a controller of the cooking appliance such that, in a cooking mode of the cooking appliance, the transparent cover is configured, by the cover heater, to reach a temperature above a temperature of the cooking chamber wall surrounding the transparent cover.

6. The cooking appliance of claim 5, wherein the cover heater has a heating capacity of at least 20 W.

7. The cooking appliance of claim 6, wherein the heating capacity is at least 50 W.

8. The cooking appliance of claim 5, wherein, in a cooking mode of the cooking appliance, the transparent cover it configured, by the cover heater, to reach a temperature of at least 100° C.

9. A method for operating the cooking appliance of claim 1, comprising:

controlling the cover heater by a controller of the cooking appliance such that the transparent cover remains free from condensation in any operating state of the cooking appliance.

10. The method of claim 9, wherein the cover heater is controlled by the controller of the cooking appliance such that, in a cooking mode of the cooking appliance, the cover heater is configured to cause the transparent cover to reach a temperature above a temperature of the cooking chamber wall surrounding the cover.

11. The method of claim 10, wherein the cover heater is controlled by the controller of the cooking appliance such that, in the cooking mode of the cooking appliance, the cover heater is configured to cause the transparent cover to reach a temperature of at least 100° C.

12. The method of claim 9, wherein, in a steam-assisted cooking mode of the cooking appliance, the controller controls the cover heater such that the cover heater is turned on substantially simultaneously with a beginning of the steam-assisted cooking mode.

13. A method for operating a cooking appliance, the method comprising:

providing the cooking appliance, the cooking appliance comprising:

a housing having a cooking chamber disposed in the housing and bounded by at least one cooking chamber wall of the housing; and a camera disposed in the housing, the camera being configured to observe the cooking chamber and/or an item to be cooked placed in the cooking camber, the camera being in image transmission connection with the cooking chamber via a housing opening in the at least one cooking chamber wall, the housing opening being sealed with respect to the cooking chamber by a transparent cover, the transparent cover being in heat transfer connection with a cover heater; and controlling the cover heater by a controller of the cooking appliance such that the transparent cover remains free from condensation in any operating state of the cooking appliance, wherein the cover heater is controlled by the controller of the cooking appliance such that, in a pyrolysis mode of the cooking appliance, the cover heater is configured to cause the transparent cover to reach a temperature of at least 400° C.

14. The method of claim 13, wherein, in the pyrolysis mode of the cooking appliance, the controller controls the cover heater such that, substantially after the cooking chamber is heated to a predefined pyrolysis temperature, the cover heater is turned on at a beginning of a holding phase of the predefined pyrolysis temperature.

15. A method for operating a cooking appliance, the method comprising:

providing the cooking appliance, the cooking appliance comprising:

a housing having a cooking chamber disposed in the housing and bounded by at least one cooking chamber wall of the housing; and a camera disposed in the housing, the camera being configured to observe the cooking chamber and/or an item to be cooked placed in the cooking camber, the camera being in image transmission connection with the cooking chamber via a housing opening in the at least one cooking chamber wall, the housing opening being sealed with respect to the cooking chamber by a transparent cover, the transparent cover being in heat transfer connection with a cover heater; and controlling the cover heater by a controller of the cooking appliance such that the transparent cover remains free from condensation in any operating state of the cooking appliance, wherein, in a pyrolysis mode of the cooking appliance, the controller controls the cover heater such that, substantially after the cooking chamber is heated to a predefined pyrolysis temperature, the cover heater is turned on at a beginning of a holding phase of the predefined pyrolysis temperature.

* * * * *